United States Patent
Hudson et al.

(10) Patent No.: US 8,946,551 B2
(45) Date of Patent: Feb. 3, 2015

(54) FLOOR WIRE HARNESS PACKAGE ASSEMBLY AND INSTALLATION METHODS

(71) Applicants: Darryl Hudson, Ohatchee, AL (US); Tracy Shaddix, Oxford, AL (US)

(72) Inventors: Darryl Hudson, Ohatchee, AL (US); Tracy Shaddix, Oxford, AL (US)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 16 days.

(21) Appl. No.: 13/861,006

(22) Filed: Apr. 11, 2013

(65) Prior Publication Data

US 2014/0305697 A1    Oct. 16, 2014

(51) Int. Cl.
*H01B 7/00* (2006.01)
*H02G 1/06* (2006.01)
*H02G 3/30* (2006.01)

(52) U.S. Cl.
CPC .............. *H02G 3/30* (2013.01); *H01B 7/0045* (2013.01); *H02G 1/06* (2013.01)
USPC ...... 174/72 A; 174/72 R; 174/68.1; 174/68.3; 439/207

(58) Field of Classification Search
USPC ............. 174/72 A, 72 R, 68.1, 68.3; 439/207
See application file for complete search history.

(56) References Cited

U.S. PATENT DOCUMENTS

| 5,016,859 | A | | 5/1991 | Zimmer et al. |
| 5,649,626 | A | | 7/1997 | Sawamura et al. |
| 5,703,330 | A | * | 12/1997 | Kujawski ................ 174/72 A |
| 5,861,579 | A | | 1/1999 | Bickersteth et al. |
| 6,229,091 | B1 | * | 5/2001 | Ogawa et al. ............ 174/72 A |
| 6,946,604 | B1 | | 9/2005 | Maris |
| 7,581,564 | B2 | * | 9/2009 | Tanaka et al. ............. 138/110 |
| 8,022,300 | B2 | * | 9/2011 | Yamamoto ............... 174/72 A |
| 8,069,556 | B2 | | 12/2011 | Selbach |

* cited by examiner

*Primary Examiner* — Dhirubhai R Patel
(74) *Attorney, Agent, or Firm* — Quarles & Brady LLP

(57) ABSTRACT

A method of installing a wire harness on a floor of a vehicle body includes providing a package assembly including a sheet having a first portion and a second portion and providing a wire harness including a plurality of insulated electrical wires connected to a plurality of electrical connectors. The wire harness is positioned on the sheet. The first portion is displaced toward the second portion to provide a wire harness package assembly. The wire harness package assembly is positioned on the floor of the vehicle body. The first portion is displaced away from the second portion on the floor of the vehicle. Each of the plurality of electrical connectors are connected to one of a plurality of in-vehicle electrical connectors.

17 Claims, 14 Drawing Sheets

FLOOR WIRE HARNESS PACKAGE ASSEMBLY AND INSTALLATION METHODS

BACKGROUND

Automobiles include various electrical components, such as sensors, lights, actuators, instrument clusters, and the like, that are connected to power sources, on-board computing devices, and each other via, in some cases, elongated electrical wires extending through the vehicle body. Such electrical wiring is typically routed along the floor of the vehicle. In many cases, a one-piece floor harness is used to secure the wires on the floor of the vehicle.

Unfortunately, these one-piece floor harnesses create various installation problems. For example, one-piece floor harnesses are difficult to untangle and arrange such that each electrical connector on the harness is in proximity to the proper connector on the floor of the vehicle. Furthermore, connectors are frequently broken as operators move within the vehicle and position the floor harness. Furthermore, repeatedly positioning floor harnesses is physically taxing and creates ergonomic issues for operators.

SUMMARY

The disclosure relates in general to a floor wire harness package assembly and installation methods that allow a floor wire harness to be laid out in a vehicle and installed quickly and easily. Initially outside of a vehicle, the floor wire harness package assembly is folded from an unfolded configuration to a relatively compact folded configuration that facilitates easy handling. In addition, while outside of the vehicle and before folding the floor harness package assembly, the floor harness occupies a layout in which the electrical connectors of the harness are appropriately arranged, relative to each other, for installation in the vehicle. Upon unfolding the floor harness package assembly within the vehicle, the harness immediately occupies or may be moved over a short distance to occupy an appropriate arrangement for installation in the vehicle. Thus, the floor harness package assembly and methods reduce the risk of damaging connectors and improve operator ergonomics during installation.

In one implementation, the present disclosure provides a method of installing a wire harness on a floor of a vehicle body. The method includes providing a package assembly including a sheet having a first portion and a second portion and providing a wire harness including a plurality of insulated electrical wires connected to a plurality of electrical connectors. The wire harness is positioned on the sheet. The first portion is displaced toward the second portion to provide a wire harness package assembly. The wire harness package assembly is positioned on the floor of the vehicle body. The first portion is displaced away from the second portion on the floor of the vehicle. Each of the plurality of electrical connectors are connected to one of a plurality of in-vehicle electrical connectors.

In another implementation, the present disclosure provides a method of installing a wire harness on a floor of a vehicle body. The method includes providing a package assembly including a sheet and providing a wire harness including a plurality of insulated electrical wires connected to a plurality of electrical connectors. The wire harness is positioned on the sheet and the plurality of electrical connectors are arranged in a first arrangement. The plurality of electrical connectors are moved to a second arrangement. A first portion of the sheet is displaced toward a second portion of the sheet to provide a wire harness package assembly. The wire harness package assembly is positioned on the floor of the vehicle body. The first portion of the sheet is displaced away from the second portion of the sheet. The plurality of electrical connectors are moved to the first arrangement. Each of the plurality of electrical connectors are connected to one of a plurality of in-vehicle electrical connectors without substantially moving the plurality of electrical connectors from the first arrangement.

In another implementation, the present disclosure provides a floor wire harness package assembly. The assembly includes a sheet having a first portion, a second portion foldably connected to the first portion, and a third portion foldably connected to the second portion. The assembly also includes a wire harness having a plurality of insulated electrical wires connected to a plurality of electrical connectors. The plurality of insulated electrical wires and the plurality of electrical connectors define a first portion disposed between the first portion and the second portion and a second portion connected to the first portion and disposed between the first portion and the third portion.

DETAILED DESCRIPTION OF THE DRAWINGS

The disclosure relates in general to a floor wire harness package assembly and installation methods that allow a floor wire harness to be laid out in a vehicle and installed quickly and easily. Initially outside of a vehicle, the floor wire harness package assembly is folded from an unfolded arrangement to a relatively compact folded arrangement that facilitates easy handling. In addition, while outside of the vehicle and before folding the floor harness package assembly, the floor harness occupies a layout in which the electrical connectors of the harness are appropriately arranged, relative to each other, for installation in the vehicle. Upon unfolding the floor harness package assembly within the vehicle, the harness immediately occupies or may be moved over a short distance to occupy an appropriate arrangement for installation in the vehicle. Thus, the floor harness package assembly and methods reduce the risk of damaging connectors and improve operator ergonomics during installation.

The present system and method is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. The system and method may both be practiced without one or more of the specific details, or with other methods, components, materials, and so forth. In other instances, well-known structures, materials, or operations are not shown or described in detail to avoid obscuring aspects of the disclosure.

Figure 9:
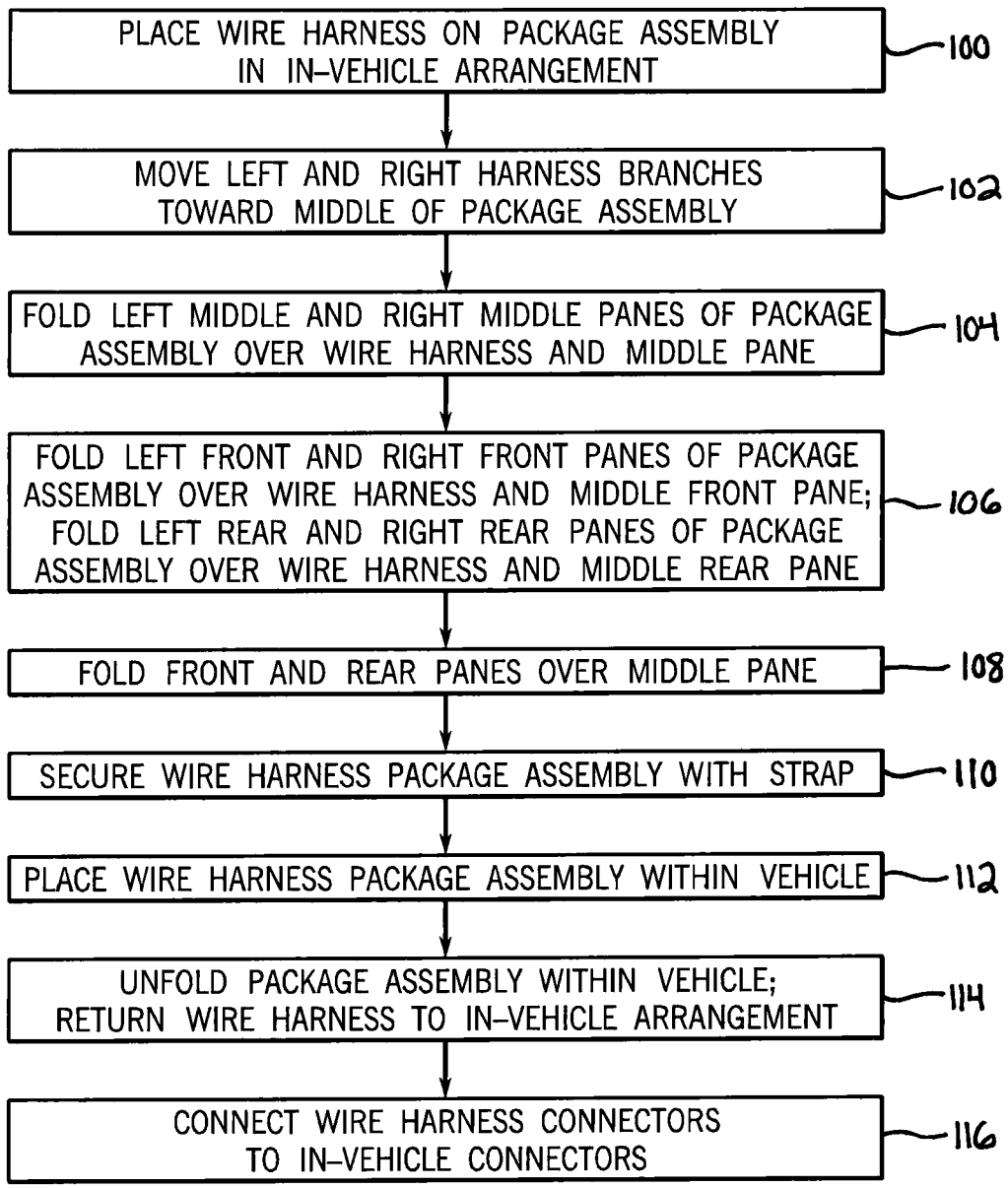
FIG. 9 illustrates steps in a method of installing the floor harness in a vehicle.

The schematic flow chart diagrams included are generally set forth as logical flow-chart diagrams (for example, FIG. 9). As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. The order in which a particular method occurs may or may not strictly adhere to the order of the corresponding steps shown.

Figure 1:
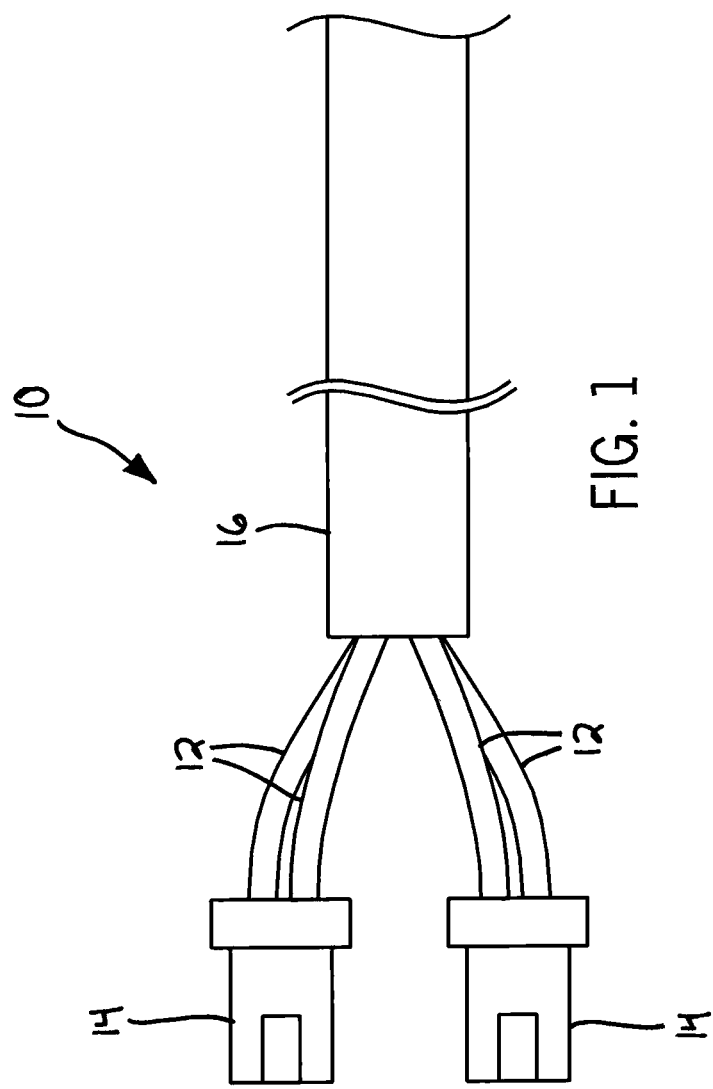
FIG. 1 illustrates a floor wire harness that may be used in accordance with the present disclosure.
Figure 3:
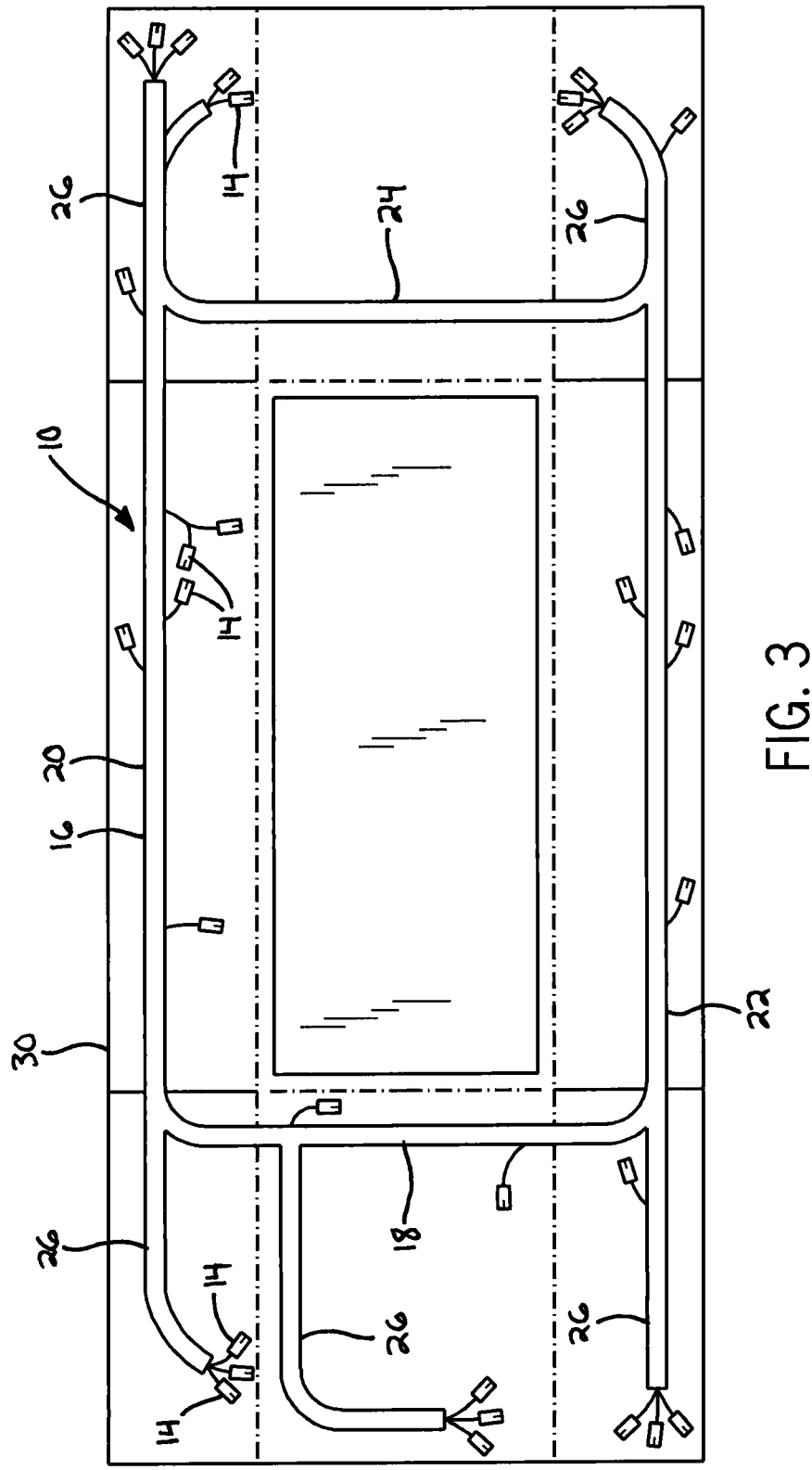
FIG. 3 illustrates the floor wire harness in an in-vehicle arrangement and placed on a foldable sheet of the package assembly prior to folding the foldable sheet.

FIGS. 1 and 3 illustrate an exemplary "one-piece" vehicle floor wire harness 10 that may be used in accordance with the present disclosure. The floor harness 10 includes a plurality of insulated electrical wires 12 connected to a plurality of electrical connectors 14 (five of which are identified in FIG. 3). Various types of appropriate wires and connectors will be recognized by those skilled in the art. The plurality of electrical wires 12 may be enclosed and protected by a flexible housing 16 comprising, for example, one or more flexible polymers or the like.

As shown in FIG. 3, the floor harness 10 may include a front branch 18, a right branch 20, a left branch 22, and a rear branch 24 connected to define a generally rectangular shape. The branches 18-24 may each support one or more arms 26. Both the branches 18-24 and arms 26 may include various connectors 14 disposed at appropriate positions for subsequent connection to electrical connectors supported by a vehicle's floor.

Figure 2:
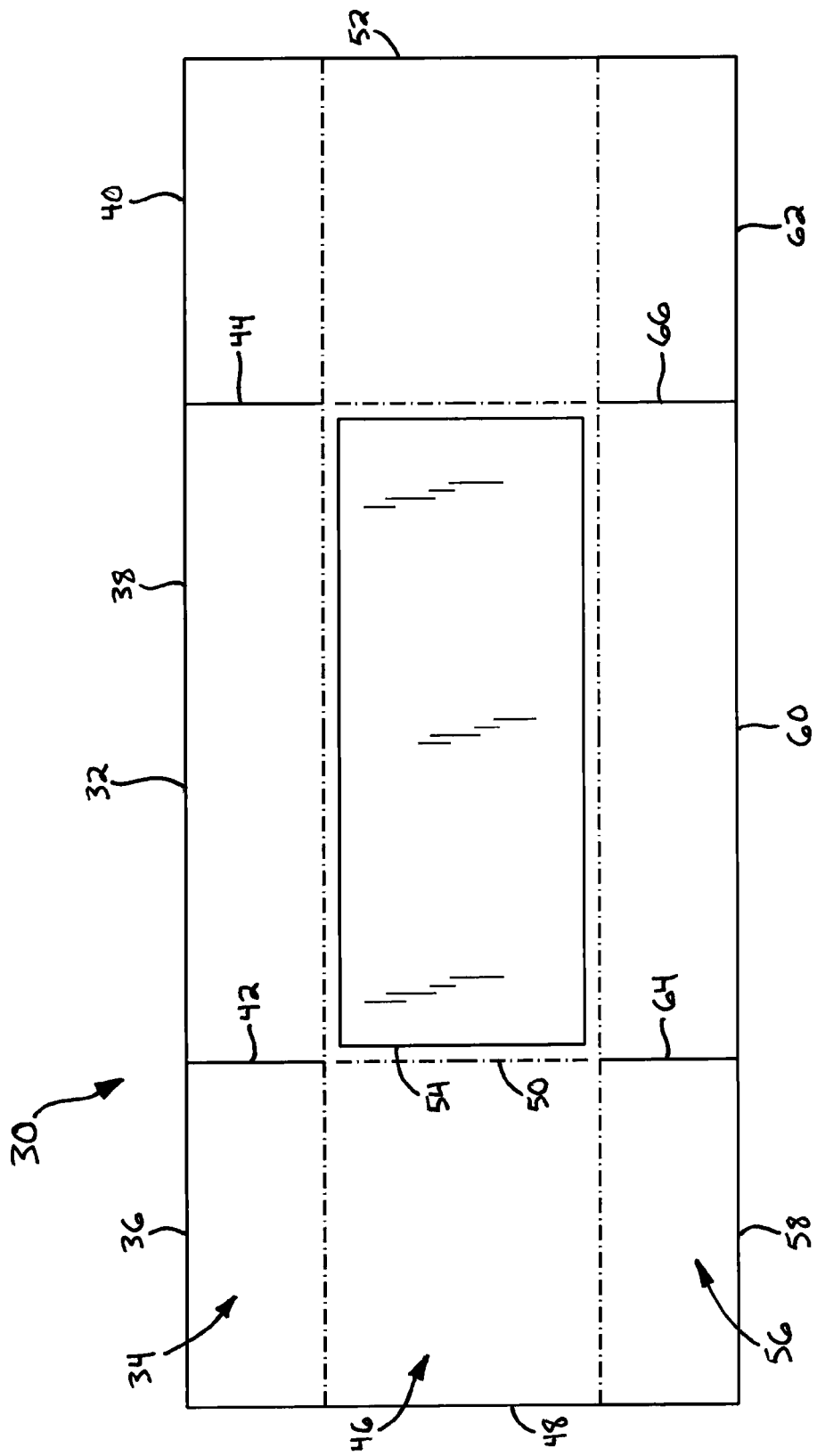
FIG. 2 illustrates a package assembly that may be used in accordance with the present disclosure.

FIG. 2 illustrates a package assembly 30 that may be used in accordance with the present disclosure. The package assembly 30 includes a foldable sheet 32 that may comprise one or more flexible materials, such as polymers, woven fabrics, non-woven fabrics, or the like. The foldable sheet 32 has a generally rectangular shape and defines a three-by-three array of panes or portions that are subsequently folded relative to each other to provide a wire harness package assembly. The array of panes includes a right row 34 having a right front pane 36, a right middle pane 38, and a right rear pane 40. For reasons described in further detail below, the right front pane 36 may be separated from the right middle pane 38 by a first slit 42 and the right middle pane 38 may be separated from the right rear pane 40 by a second slit 44.

The array of panes also includes a middle row 46 having a middle front pane 48, a middle pane 50, and a middle rear pane 52. The middle pane 50 subsequently serves as the base for the wire harness package assembly and thus may connect to a rigid panel 54 such as a thin wood panel, a cardboard panel, or the like. As used herein, the term "rigid" refers to materials that are stiffer than the material of the foldable sheet 32.

The array of panes further includes a left row 56 having a left front pane 58, a left middle pane 60, and a left rear pane 62. For reasons described in further detail below, the left front pane 58 may be separated from the left middle pane 60 by a third slit 64 and the left middle pane 60 may be separated from the left rear pane 62 by a fourth slit 66.

Some of the panes, for example, the right front pane 36 and the middle front pane 48, integrally connect to each other. In the figures, dashed lines are used at the interface between such panes to indicate that the panes are subsequently folded relative to each other. Furthermore, it should be noted that due to the thickness of the foldable sheet 32 and the presence of the floor harness 10, the folding interfaces could have a width of several inches or more.

The foldable sheet 32 may have the following exemplary dimensions. The foldable sheet 32 may have an overall length (in the horizontal direction on FIG. 2) of about 84 in. and an overall width (in the vertical direction on FIG. 2) of about 60 in. The rigid panel 54 may have a length of about 38 in. and a width of about 20 in. The right front pane 36, the middle front pane 48, the left front pane 58, the right rear pane 40, the middle rear pane 52, and the left rear pane 62 may each have a length of about 23 in. and a width of about 20 in. The right middle pane 38 and the left middle pane 60 may each have a length of about 38 in. and a width of about 20 in. The slits 42, 44, 64, and 66 may each have a length of about 17 in.

Turning now to FIGS. 3-9, steps for assembling a wire harness package assembly and installing the floor harness 10 will be described. First and apart from the vehicle, the floor harness 10 is arranged on the unfolded package assembly 30 as shown in FIG. 3 (see step 100 in FIG. 9). In particular, the floor harness 10 is positioned on the package assembly 30 in a first or in-vehicle arrangement. As used herein, the term "in-vehicle arrangement" refers to a configuration of the floor harness 10 in which each of the connectors 14 would be spaced apart from its mating connector supported on the vehicle's floor by no more than 12 in. if the floor harness 10 was actually disposed on the vehicle's floor. Stated another way, in an in-vehicle arrangement, the connectors 14 are spaced from each other by about the same distances as in their final assembled positions.

Figure 4:
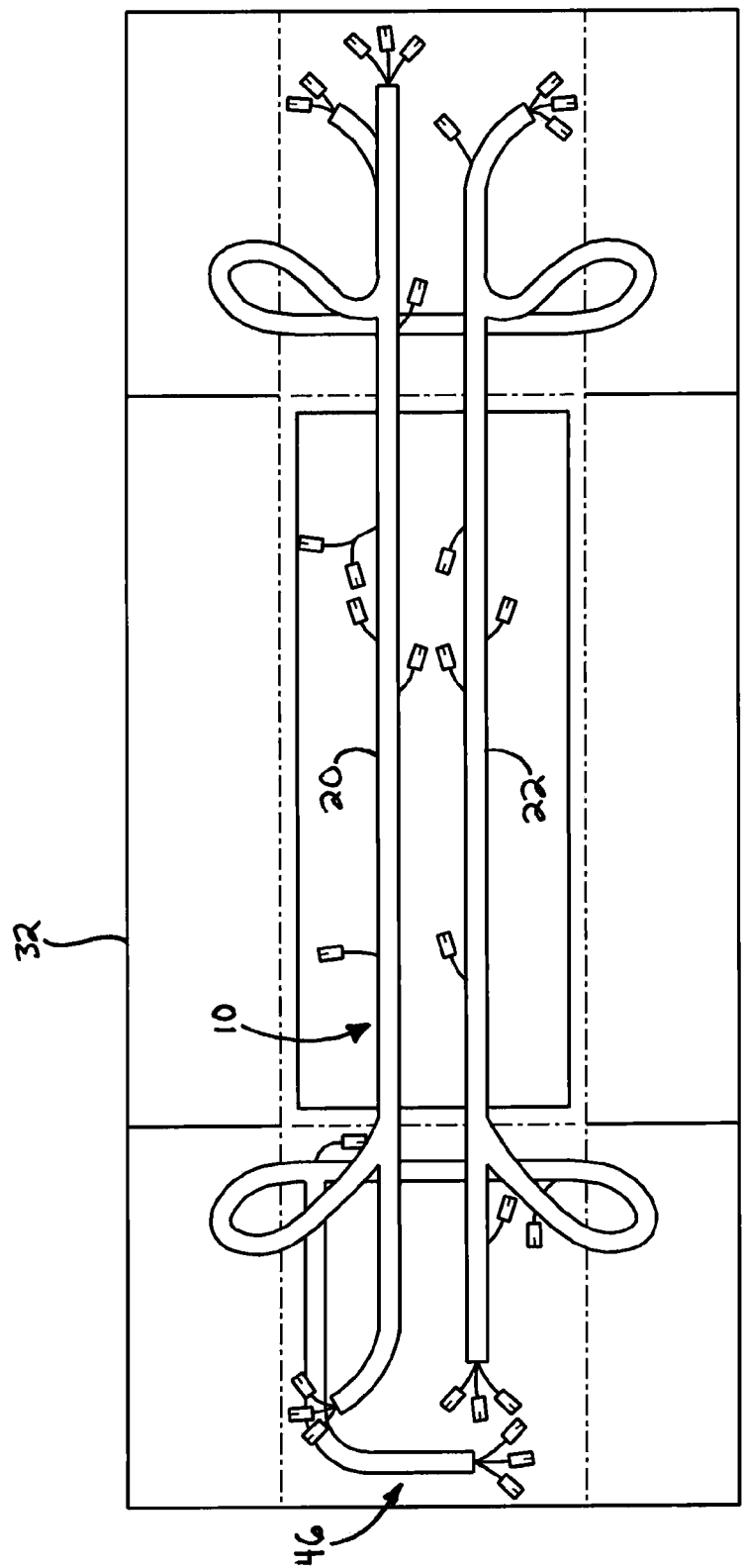
FIG. 4 illustrates the floor wire harness after left and right branches are moved toward the middle of the package assembly.
Figure 5:
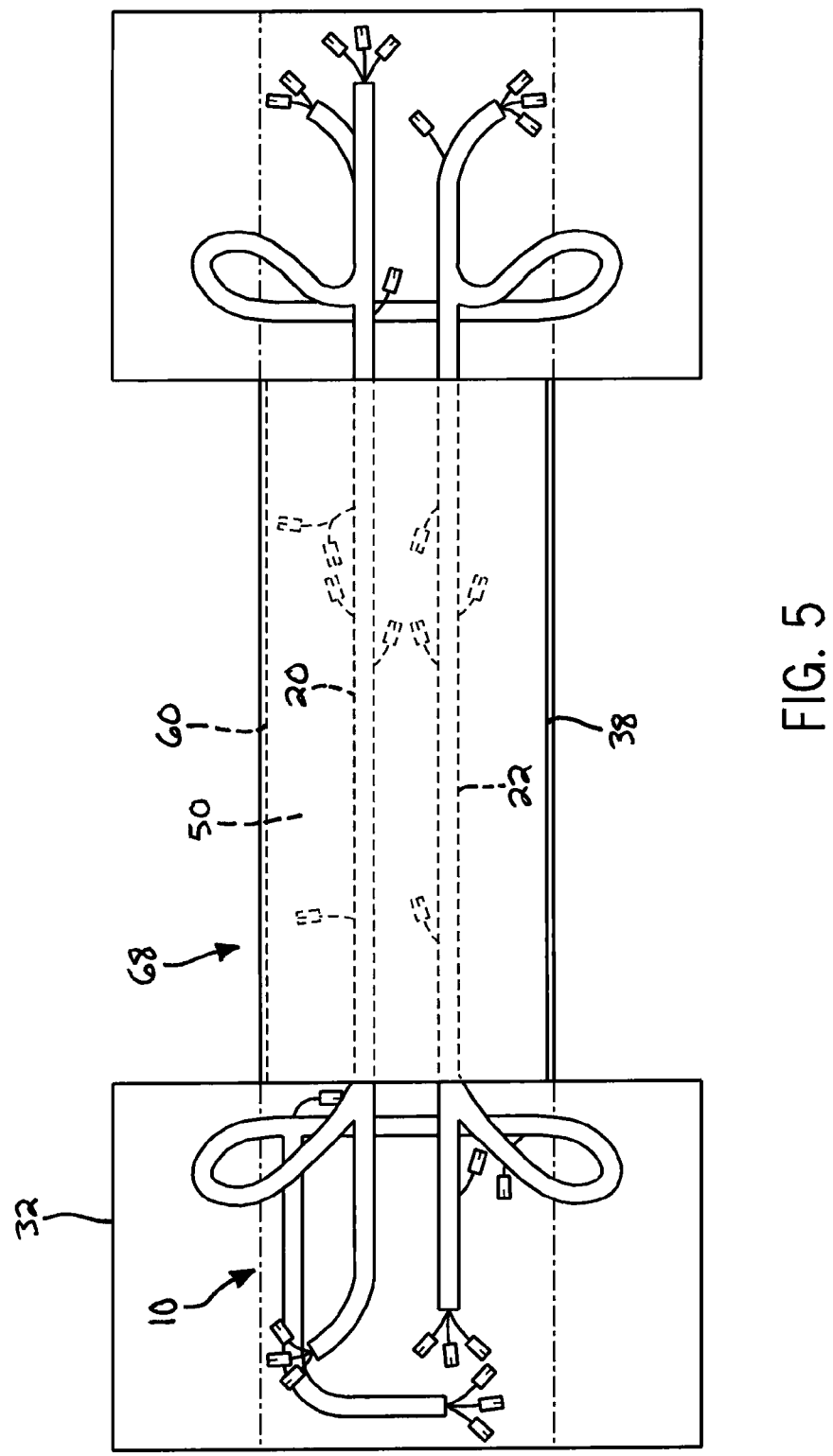
FIG. 5 illustrates the package assembly after folding left and right middle panes of the foldable sheet over the wire harness and a middle pane.

Next and as shown in FIG. 4, the right branch 20 and the left branch 22 are folded over and displaced toward the middle row 46 of the foldable sheet 32 as shown at step 102. Thus, the floor harness 10 occupies a second arrangement that differs from the in-vehicle arrangement. As shown in FIG. 5, the right middle pane 38 and the left middle pane 60 are next folded over the middle pane 50 at step 104. This provides a folded middle pane 68 in which several portions of the floor harness 10 are disposed between different panes of the foldable sheet 32. Specifically, the right branch 20 and the left branch 22 are disposed between the middle pane 50 and the right and left middle panes 38, 60.

Figure 6:
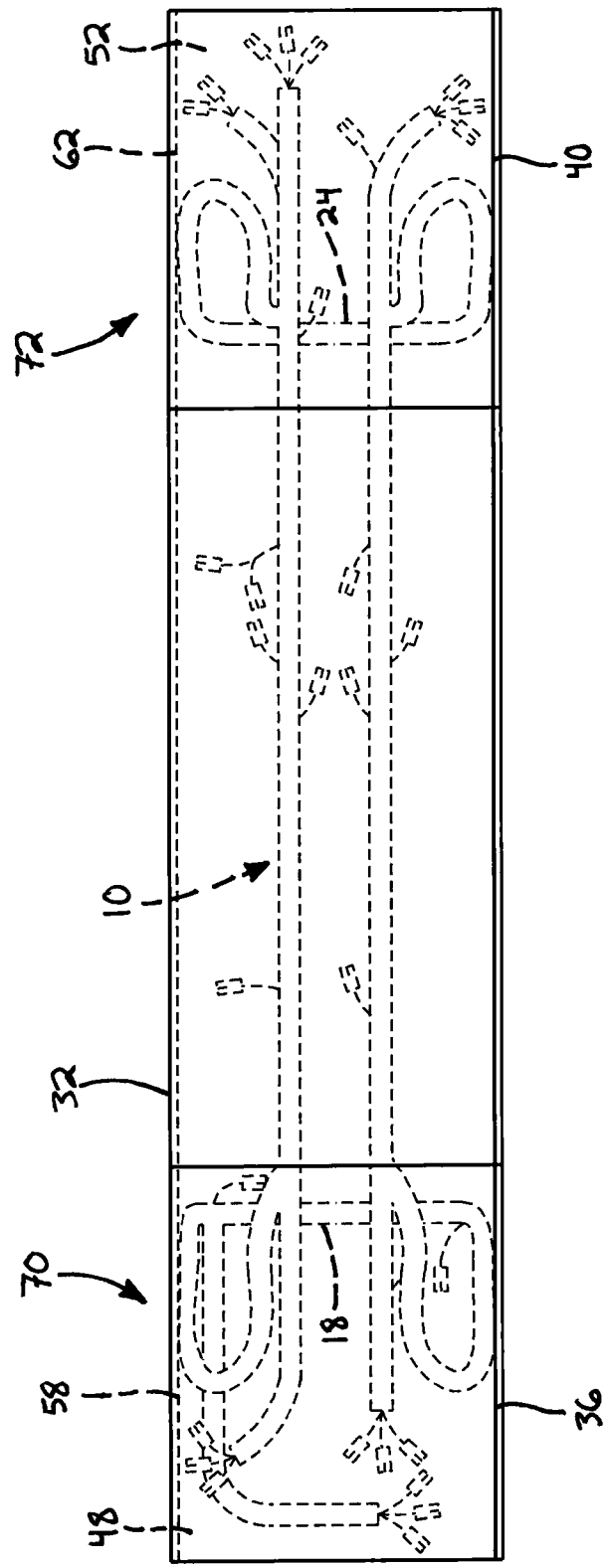
FIG. 6 illustrates the package assembly after folding left and right front panes over the wire harness and a middle front pane and after folding left and right rear panes over the wire harness and a middle rear pane.

Next and as shown in FIG. 6, the right front pane 36 and the left front pane 58 are folded over the middle front pane 48 and the right rear pane 40 and the left rear pane 62 are folded over the middle rear pane 52 at step 106. This provides a folded front pane 70 and a folded rear pane 72 in which several portions of the floor harness 10 are disposed between different panes of the foldable sheet 32. Specifically, the front branch 18 of the wire harness 10, among other portions, is disposed between the middle front pane 48 and the right and left front panes 36, 58, and the rear branch 24 of the wire harness 10, among other portions, is disposed between the middle rear pane 52 and the right and left rear panes 40, 62.

Figure 7:
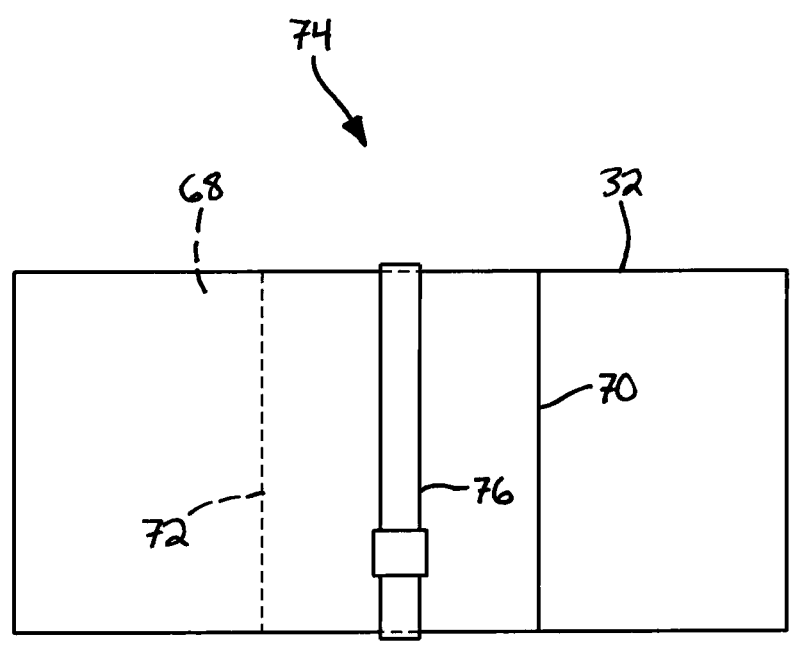
FIG. 7 illustrates the package assembly after folding front and rear panes over the middle pane and securing the package assembly with a strap.

As shown in FIG. 7, the folded front pane 70 and the folded rear pane 72 are next folded over the folded middle pane 68 at step 108. This provides a relatively compact wire harness package assembly 74 having a "sandwich-like" structure of layers of the wire harness 10 and the foldable sheet 32. In particular, the package assembly 74 includes the folded middle pane 68 as a base. The folded rear pane 72 is disposed above the folded middle pane 68, and the folded front pane 70 is disposed above the folded rear pane 72. The package assembly 74 may have, for example, a length of about 23 in., a width of about 15 in., and a height of about 6.5 in.

Figure 8:
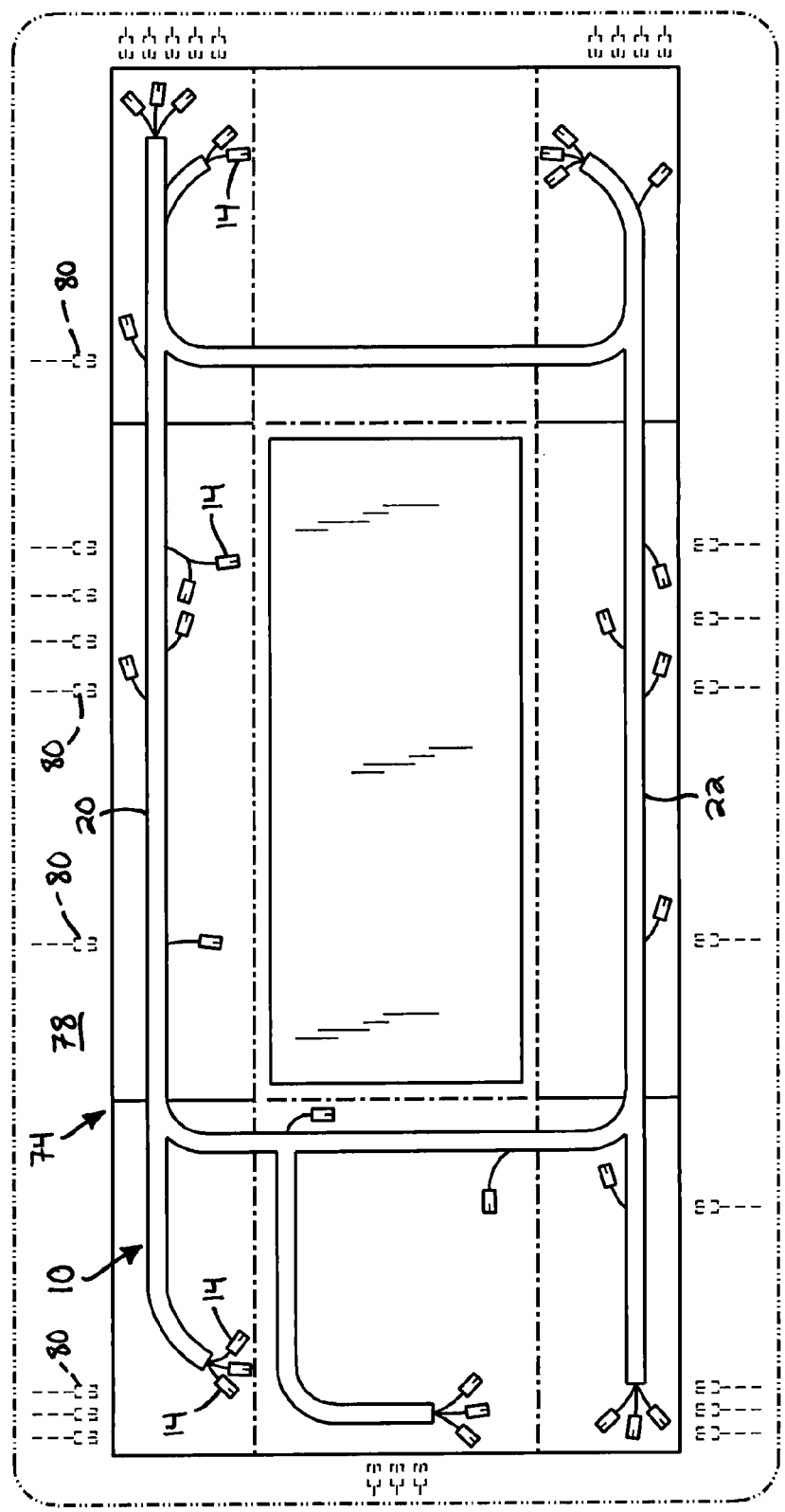
FIG. 8 illustrates the package assembly after unfolding the foldable sheet on a vehicle's floor.

Still referring to FIG. 7, the package assembly 74 may be secured with a detachable strap 76 at step 110. At step 112 and as shown in FIG. 8, the package assembly 74 is transported to and placed on a vehicle's floor 78. The package assembly 74 is positioned such that the folded middle pane 68 is disposed directly above the vehicle's floor 78, the folded front pane 70 is nearest to the front of the vehicle, and the folded rear pane 72 is nearest to the rear of the vehicle.

Still referring to FIG. 8, the package assembly 74 is unfolded on the vehicle's floor 78 at step 114. This includes performing the inverse of steps 104-110 (that is, removing instead of attaching the strap 76 and unfolding instead of folding the panes) in the reverse order of the above (that is, step 108 follows step 110 and so forth). In addition, the right branch 20 and the left branch 22 are unfolded and the floor harness 10 is returned to the in-vehicle arrangement. At step 116, each of the electrical connectors 14 is connected to the appropriate connector 80 supported by the vehicle's floor 78 (four of which are identified in FIG. 8).

Figure 10:
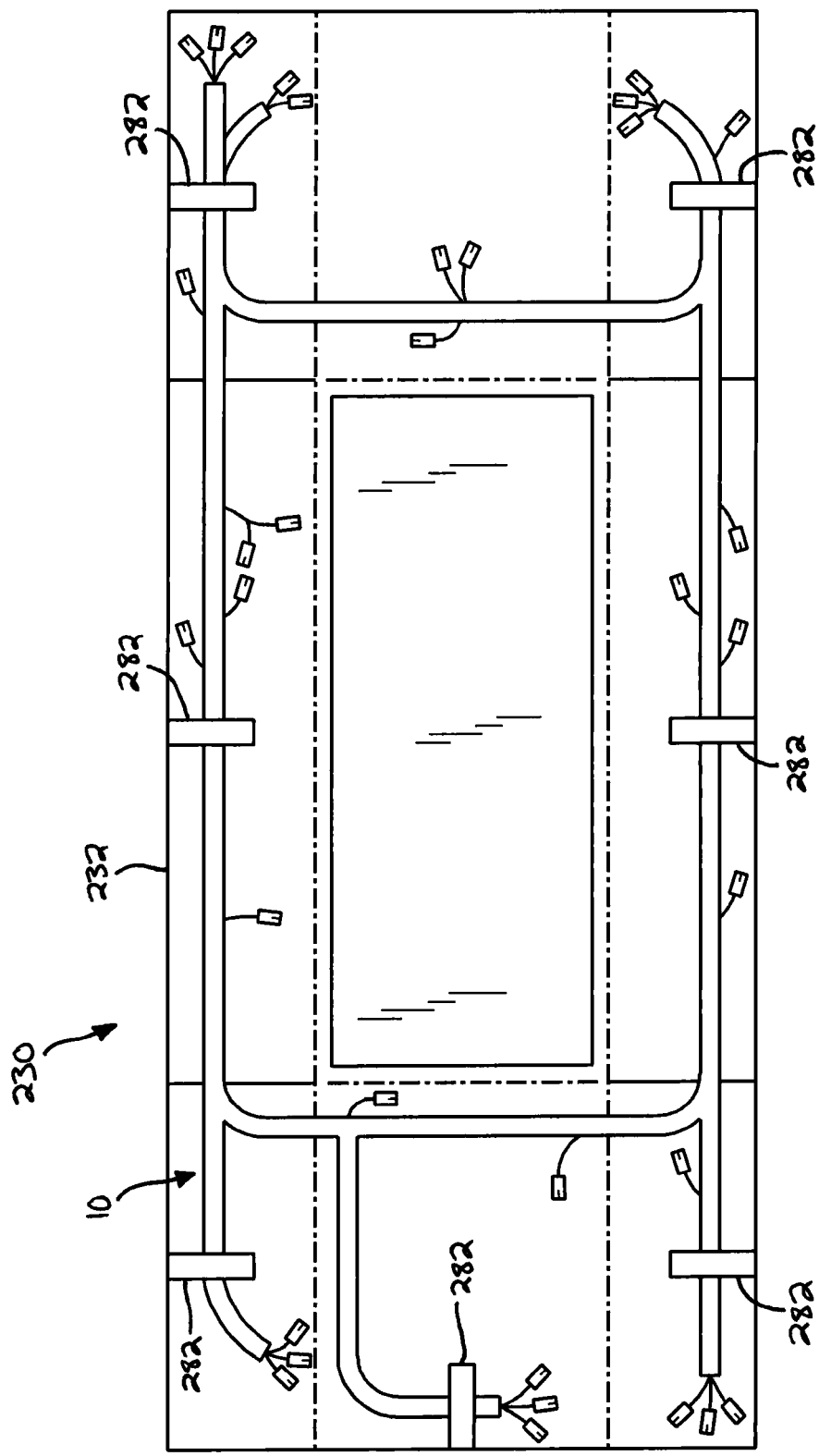
FIG. 10 illustrates the floor wire harness in an in-vehicle arrangement and secured to an alternative foldable sheet of the package assembly prior to folding the foldable sheet.

Turning now to FIGS. 10-14, an alternative package assembly 230 and a method for assembling a wire harness package assembly and installing the floor harness 10 will be described. First and apart from the vehicle as shown in FIG. 10, the floor harness 10 is arranged on an unfolded package assembly 230 (see step 300 in FIG. 14). The floor harness 10 is positioned on the package assembly 230 in an in-vehicle arrangement. The wire harness 10 is next secured to the foldable sheet 232 via a plurality of selectively engagable fasteners 282 (for example, Velcro® straps, straps supporting snap connectors, or the like) supported by the foldable sheet 232 at step 302.

Figure 11:
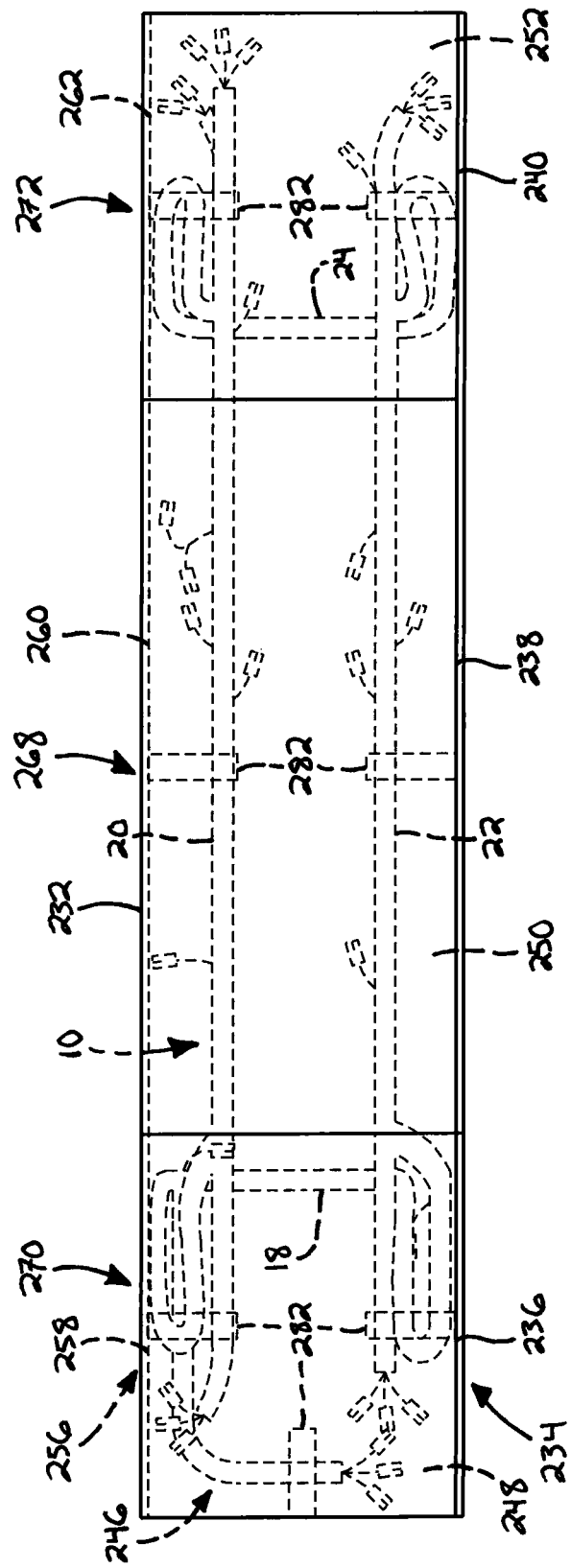
FIG. 11 illustrates the package assembly after folding left and right rows of panes over the wire harness and a middle row of panes.

Next and as shown in FIG. 11, the right row 234 and the left row 256 of panes are folded over the middle row 246 of panes at step 304. Due to the fasteners 282, this action also moves the floor harness 10 to a second arrangement. Further, this action provides a folded front pane 270, a folded middle pane 268, and a folded rear pane 272 in which several portions of the floor harness 10 are disposed between different panes of the foldable sheet 232. Specifically, the front branch 18 of the wire harness 10, among other portions, is disposed between the middle front pane 248 and the right and left front panes 236, 258. The right branch 20 and the left branch 22 are disposed between the middle pane 250 and the right and left middle panes 238, 260. The rear branch 24 of the wire harness 10, among other portions, is disposed between the middle rear pane 252 and the right and left rear panes 240, 262.

Figure 12:
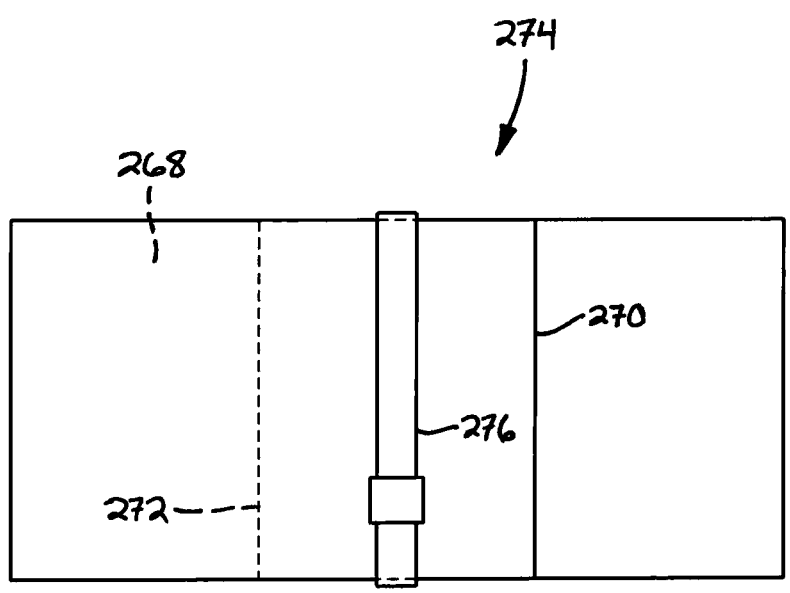
FIG. 12 illustrates the package assembly after folding the front and rear panes over the middle pane and securing the package assembly with a strap.

As shown in FIG. 12, the folded front pane 270 and the folded rear pane 272 are next folded over the folded middle pane 268 at step 306. This provides a relatively compact wire harness package assembly 274 having a "sandwich-like" structure of layers of the wire harness 10 and the foldable sheet 232. In particular, the package assembly 274 includes the folded middle pane 268 as a base. The folded rear pane 272 is disposed above the folded middle pane 268, and the folded front pane 270 is disposed above the folded rear pane 272. The package assembly 274 may have, for example, a length of about 23 in., a width of about 15 in., and a height of about 6.5 in.

Figure 13:
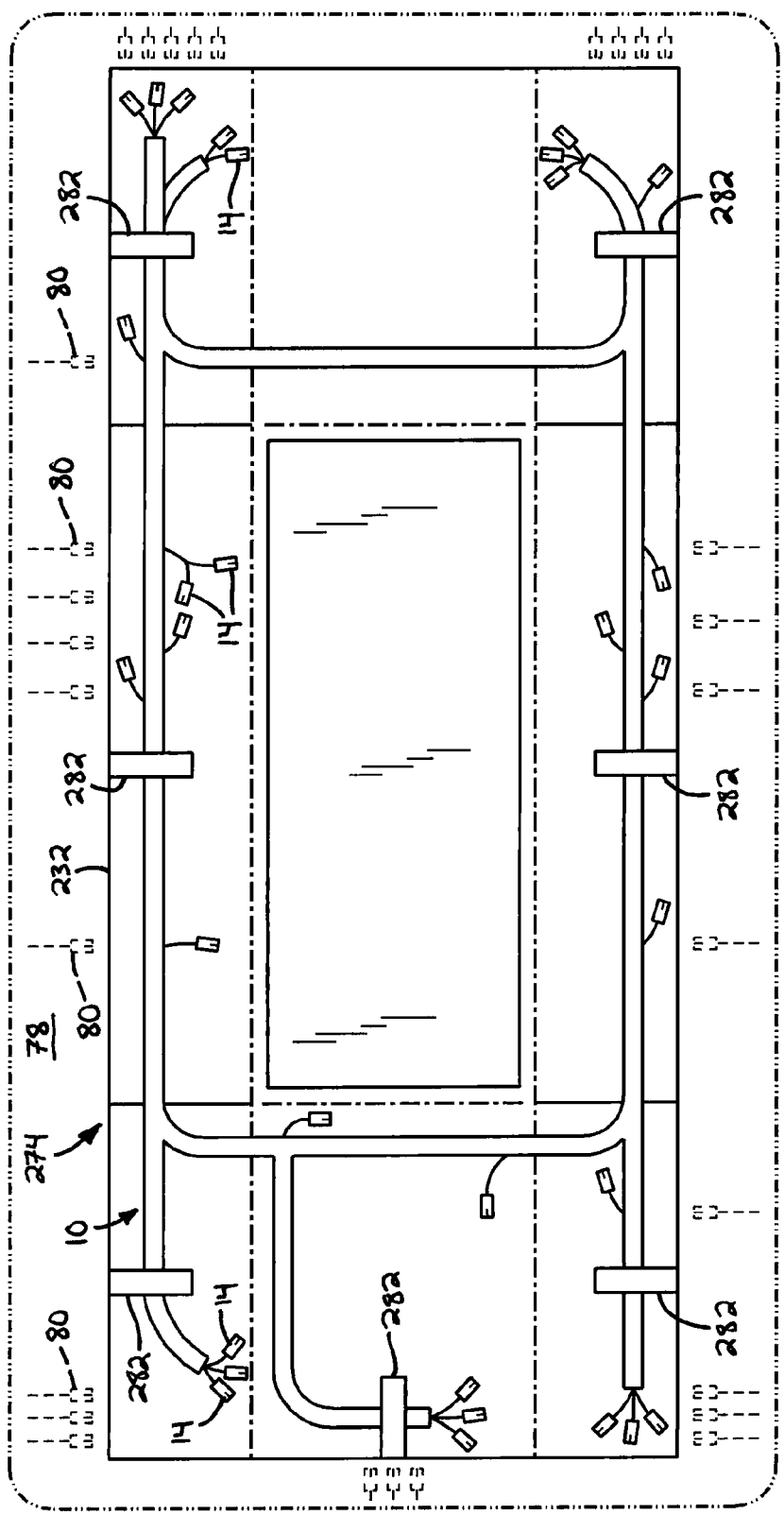
FIG. 13 illustrates the package assembly after unfolding the foldable sheet and the floor harness on a vehicle's floor.
Figure 14:
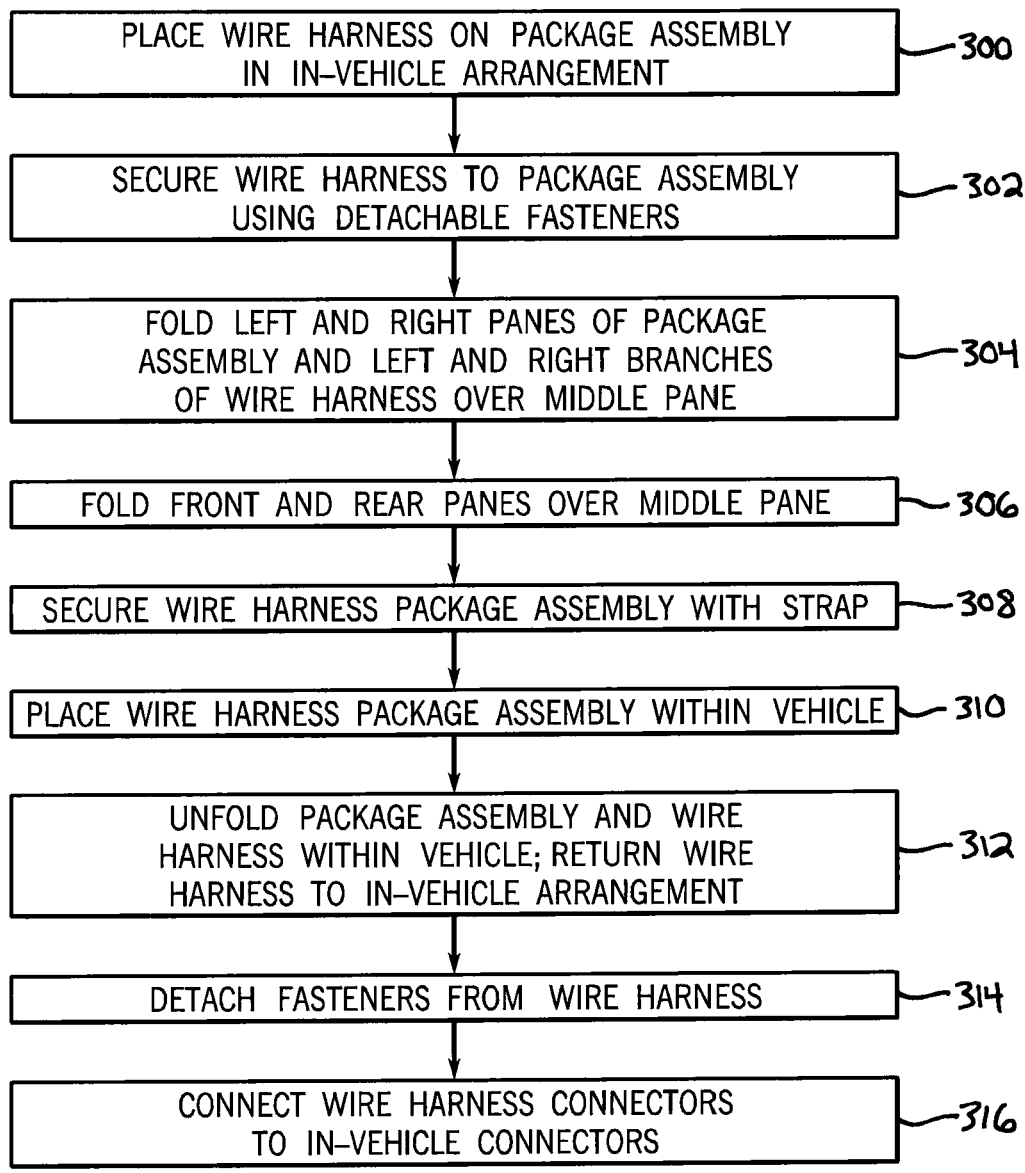
FIG. 14 illustrates steps in an alternative method of installing the floor harness in a vehicle.

Still referring to FIG. 12, the package assembly 274 may be secured with a detachable strap 276 at step 308. At step 310 and as shown in FIG. 13, the package assembly 274 is transported to and placed on a vehicle's floor 78. The package assembly 274 is positioned such that the folded middle pane 268 is disposed directly above the vehicle's floor 78, the folded front pane 270 is nearest to the front of the vehicle, and the folded rear pane 272 is nearest to the rear of the vehicle.

Still referring to FIG. 13, the package assembly 274 is unfolded on the vehicle's floor 78 at step 312. This includes performing the inverse of steps 304-308 (that is, removing instead of attaching the strap 76 and unfolding instead of folding the panes) in the reverse order of the above (that is, step 306 follows step 308 and so forth). Thus, the floor harness 10 is returned to the in-vehicle arrangement by unfolding the foldable sheet 232. At step 314, the fasteners 282 are detached from the floor harness 10. At step 316, each of the electrical connectors 14 is connected to the appropriate connector 80 supported by the vehicle's floor 78.

In some implementations, the slits 42, 44, 64, and 66 could be omitted and all of the panes of the right row 34 and the left row 56 could be folded coordinately (that is, in the manner of step 304 described above). However and depending on the degree of flexibility of the floor harness 10, it may be less difficult to fold the panes separately (that is, in the manner of steps 104 and 106 described above).

In some implementations, some or all of the outer panes (that is, the panes other than the middle pane 50) could support rigid panels apart from areas at which the foldable sheet 32 folds.

In some implementations, the foldable sheet 232 could include different numbers and configurations of fasteners 282. In addition, some panes could have multiple fasteners 282, and some panes could have no fasteners.

In some implementations, the package assembly 74 could be formed by displacing the portions of the sheet 32 in other similar manners to folding. For example, the sheet 32 could initially be positioned in an open arrangement (see FIG. 3) and the floor harness 10 could initially be positioned in an in-vehicle arrangement. The sheet 32 and the floor harness 10 could then be rolled to provide a package assembly in which the sheet 32 occupies a "compact" arrangement. As another example, the sheet 32 could be folded in the opposite manner to that described above such that the floor harness 10 is "outside" of the folded panes when the sheet occupies a compact arrangement. As yet another example, the portions of the sheet 32 and the floor harness 10 could be folded in an unorganized manner (that is, "crumpled") to form a compact package assembly.

Although the present disclosure has been described with respect to preferred embodiments, any person skilled in the art will recognize that changes may be made in form and detail, and equivalents may be substituted for elements of the disclosure without departing from the spirit and scope of the disclosure. Therefore, it is intended that the disclosure not be limited to the particular embodiments, but will include all embodiments falling within the scope of the appended claims.

What is claimed is:

1. A method of installing a wire harness on a floor of a vehicle body, the method comprising the steps of:
   providing a package assembly including a sheet having a first pane portion and a second pane portion, the first pane portion foldably connected to the second pane portion;
   providing a wire harness including a plurality of insulated electrical wires connected to a plurality of electrical connectors;
   positioning the wire harness on the sheet;
   folding the first pane portion over the second pane portion to provide a compact wire harness package assembly including the sheet and the wire harness, the wire harness being disposed between the first pane portion and the second pane portion;
   positioning the compact wire harness package assembly on the floor of the vehicle body;
   unfolding the first pane portion away from the second pane portion on the floor of the vehicle; and
   connecting each of the plurality of electrical connectors to one of a plurality of in-vehicle electrical connectors.

2. The method of claim 1, wherein the wire harness includes a first branch and a second branch, and the step of folding the first pane portion over the second pane portion and the wire harness includes displacing the first branch relative to the second branch.

3. The method of claim 1, wherein the sheet supports a plurality of fasteners configured to detachably secure the wire harness, and after the step of positioning the wire harness on the sheet and before the step of folding the first pane portion over the second pane portion, further comprising the step of detachably securing the wire harness to the sheet via the plurality of fasteners.

4. The method of claim 1, wherein the sheet includes a third pane portion, and before the step of positioning the wire harness package assembly on the floor of the vehicle body further including the step of folding the third pane portion over the second pane portion and the wire harness.

5. The method of claim 1, wherein the sheet includes a three-by-three array of pane portions including the first pane portion and the second pane portion, wherein the second pane portion is a middle pane portion, and the first pane portion is one of eight pane portions disposed outwardly of the middle pane portion.

6. The method of claim 5, wherein the step of folding the first pane portion over the second pane portion to provide the compact wire harness package assembly includes folding each of the eight pane portions over the middle pane portion.

7. The method of claim 5, wherein the three-by-three array of pane portions includes a right row of three pane portions including the first pane portion, a middle row of three pane portions including the second pane portion, and a left row of three pane portions disposed on an opposite side of the middle row than the right row, and wherein the step of folding the sheet over the wire harness to provide the wire harness package assembly includes:
   folding the left row and the right row over the middle row to provide a folded front pane portion, a folded middle pane portion, and a folded rear pane portion disposed on an opposite side of the folded middle pane portion than the folded front pane portion; and
   folding the folded front pane portion and the folded rear pane portion over the folded middle pane portion to provide the wire harness package assembly.

8. A method of installing a wire harness on a floor of a vehicle body, the method comprising the steps of:
   providing a package assembly including a sheet;
   providing a wire harness including a plurality of insulated electrical wires connected to a plurality of electrical connectors;
   positioning the wire harness on the sheet and arranging the plurality of electrical connectors in a first arrangement;
   moving the plurality of electrical connectors to a second arrangement;
   folding a first pane portion of the sheet over a second pane portion of the sheet to provide a wire harness package assembly, the first pane portion foldably connected to the second pane portion;
   positioning the wire harness package assembly on the floor of the vehicle body;
   unfolding the first pane portion of the sheet away from the second pane portion of the sheet;
   moving the plurality of electrical connectors to the first arrangement; and
   connecting each of the plurality of electrical connectors to one of a plurality of in-vehicle electrical connectors without substantially moving the plurality of electrical connectors from the first arrangement.

9. The method of claim 8, wherein the wire harness includes a left branch and a right branch, and wherein the step of moving the plurality of electrical connectors to the second arrangement includes moving the left branch and the right branch toward a middle of the sheet.

10. The method of claim 8, wherein the package assembly includes a plurality of fasteners, after the step of positioning the wire harness on the sheet, further comprising the steps of:
    detachably securing the wire harness to the sheet via the plurality of fasteners; and
    folding the first pane portion over the second pane portion and simultaneously moving the plurality of electrical connectors to the second arrangement due to securement of the wire harness to the plurality of fasteners.

11. The method of claim 10, wherein the step of unfolding the first pane portion of the sheet away from the second pane portion of the sheet includes simultaneously moving the plurality of electrical connectors to the first arrangement due to securement of the wire harness to the plurality of fasteners.

12. The method of claim 8, wherein the sheet includes a three-by-three array of pane portions including the first pane portion and the second pane portion, wherein the second pane portion is a middle pane portion, wherein the first pane portion is one of eight pane portions disposed outwardly of the middle pane portion, and wherein the step of folding the first pane portion of the sheet over the second pane portion of the sheet to provide the wire harness package assembly includes folding each of the eight pane portions over the middle pane portion.

13. The method of claim 12, wherein the three-by-three array of pane portions includes:
   a left row having a left front pane portion, a left middle pane portion, and a left rear pane portion;
   a middle row having a middle front pane portion, the middle pane portion, and a middle rear pane portion; and
   a right row having a right front pane portion, a right middle pane portion, and a right rear pane portion;
   and wherein the step of folding the first pane portion of the sheet over the second pane portion of the sheet to provide the wire harness package assembly includes:
   folding the left row and the right row over the middle row to provide a folded front pane portion, a folded middle pane portion, and a folded rear pane portion; and
   folding the folded front pane portion and the folded rear pane portion over the folded middle pane portion.

14. The method of claim 13, wherein the right front pane portion is separated from the right middle pane portion by a first slit, the right middle pane portion is separated from the right rear pane portion by a second slit, the left front pane portion is separated from the left middle pane portion by a third slit, the left middle pane portion is separated from the left rear pane portion by a fourth slit, and wherein the step of folding the left row and the right row over the middle row to provide the folded front pane portion, the folded middle pane portion, and the folded rear pane portion includes:
   folding the left middle pane portion and the right middle pane portion over the middle pane portion to provide the folded middle pane portion; and
   subsequently folding the left front pane portion and the right front pane portion over the middle front pane portion to provide the folded front pane portion and folding the left rear pane portion and the right rear pane portion over the middle rear pane portion to provide the folded rear pane portion.

15. A floor wire harness package assembly, comprising:
   a sheet including:
      a first pane portion;
      a second pane portion foldably connected to the first pane portion; and
      a third pane portion foldably connected to the second pane portion;
   a wire harness having a plurality of insulated electrical wires connected to a plurality of electrical connectors, the plurality of insulated electrical wires and the plurality of electrical connectors defining:
      a first portion of the wire harness disposed between the first pane portion and the second pane portion, the first pane portion being folded over the second pane portion; and
      a second portion of the wire harness connected to the first portion of the wire harness and disposed between the second pane portion and the third pane portion, the third pane portion being folded over the second pane portion.

16. The floor wire harness package assembly of claim 15, wherein the sheet further includes a fourth pane portion foldably connected to the second pane portion opposite the third pane portion, and wherein the plurality of insulated electrical wires and the plurality of electrical connectors further define a third portion of the wire harness connected to the first portion of the wire harness opposite the second portion of the wire harness, and the third portion of the wire harness is disposed between the first pane portion and the fourth pane portion.

17. The floor wire harness package assembly of claim 15, wherein the sheet supports a plurality of fasteners detachably securing the wire harness to the sheet.

* * * * *